(12) United States Patent
Hayakawa et al.

(10) Patent No.: US 7,773,338 B2
(45) Date of Patent: Aug. 10, 2010

(54) MAGNETIC DISK DRIVE

(75) Inventors: Takako Hayakawa, Kanagawa (JP); Kouki Uefune, Kanagawa (JP); Takashi Kouno, Ibaraki (JP); Kazuhide Ichikawa, Kanagawa (JP)

(73) Assignee: Hitachi Global Storage Technologies Netherland B.V., Amsterdam (NL)

( * ) Notice: Subject to any disclaimer, the term of this patent is extended or adjusted under 35 U.S.C. 154(b) by 655 days.

(21) Appl. No.: 11/811,720

(22) Filed: Jun. 11, 2007

(65) Prior Publication Data

US 2008/0007866 A1 Jan. 10, 2008

(30) Foreign Application Priority Data

Jun. 16, 2006 (JP) ............................. 2006-167112

(51) Int. Cl.
*G11B 33/14* (2006.01)
(52) U.S. Cl. .................................................. 360/97.02
(58) Field of Classification Search ............... 360/97.02
See application file for complete search history.

(56) References Cited

U.S. PATENT DOCUMENTS

| | | | |
|---|---|---|---|
| 5,097,366 A * | 3/1992 | Ueki et al. ............... | 360/97.02 |
| 5,956,213 A | 9/1999 | Dague et al. | |
| 7,123,440 B2 * | 10/2006 | Albrecht et al. ........... | 360/97.02 |
| 7,570,455 B2 * | 8/2009 | Deguchi et al. .......... | 360/97.02 |
| 2005/0068666 A1 | 3/2005 | Albrecht et al. | |

FOREIGN PATENT DOCUMENTS

JP 07-116815 5/1995

\* cited by examiner

*Primary Examiner*—Angel A. Castro
(74) *Attorney, Agent, or Firm*—Townsend and Townsend and Crew LLP; John Henkhaus

(57) ABSTRACT

Embodiments of the present invention provide a magnetic disk drive with an enclosure that prevents the low-density gas from leaking out owing to reduction of shrinkage cavities near tapped holes. According to one embodiment of the present invention, an aluminum alloy is forced into the region of the base in which the tapped hole is to be made, by squeezing in the final stage of die casting to form the base. This procedure increases the density of aluminum alloy above 2.7 $g/cm^3$, and the densified aluminum alloy in the region for tapped holes, is free of shrinkage cavities that can cause gas leakage.

9 Claims, 7 Drawing Sheets

MAGNETIC DISK DRIVE

CROSS-REFERENCE TO RELATED APPLICATION

The instant nonprovisional patent application claims priority to Japanese Patent Application No. 2006-167112 filed Jun. 16, 2006 and incorporated by reference in its entirety herein for all purposes.

BACKGROUND OF THE INVENTION

Modern magnetic disk drives require a larger capacity, higher recording density, and a faster access speed than before, and are typically equipped with a fast rotating disk and a fast moving head-gimbal assembly. Fast rotation and movement bring about air turbulence, causing vibration to the disk and head-gimbal assembly. Air turbulence and vibration prevent the head from being positioned accurately and rapidly on the disk having densely recorded data thereon. Incapability of predicting the magnitude and cycle of randomly occurring air turbulence makes the desired positioning more complex and difficult. Moreover, the magnetic disk drive with air turbulence and vibration makes undesirable noise.

Among other problems arising from air turbulence due to rapid rotation in the magnetic disk drive is an increased power consumption. The rapidly rotating disk drags its neighboring air, generating a shear force at the boundary between the dragged air near the rotating disk and the stationary air away from the rotating disk. This shear force is a load that opposes the disk rotation, and hence it is called windage loss. The greater the rotating speed, the larger the windage loss. The motor running at a high speed against this windage loss needs a large electric power.

Noting the fact that the air turbulence and windage loss increase in proportion to the density of gas in the magnetic disk drive, there has been proposed an idea of reducing air turbulence and windage loss by replacing air in the sealed magnetic disk drive with a gas lighter than air.

Candidates for lighter-than-air gas include hydrogen and helium, with the latter being more desirable from the practical point of view. The sealed magnetic disk drive filled with helium gas is free of the above-mentioned problems and hence is capable of rapid and accurate positioning control, with quiet operation and power saving.

Unfortunately, helium gas has such a small molecule size and such a large diffusion coefficient that during operation it easily leaks out from the ordinary magnetic disk drive whose enclosure lacks complete airtightness.

U.S. Patent Publication No. 2005/0068666 ("Patent Document 1") discloses an airtight structure capable of retaining an easy-to-leak low-density gas such as helium.

According to Patent Document 1, the magnetic disk drive has an enclosure constructed as shown in FIG. 7A (which is a sectional view). The enclosure 100 is comprised of a base 120, a side wall extending from the base 120, and a cover 110 laser-welded to the top of the side wall. The interior 102 of the enclosure houses the HDD unit 101. The step of attaching the cover 110 is accomplished in an atmosphere of helium gas so that the interior 102 of the enclosure is filled with helium gas. With the cover 110 hermetically sealed, the resulting magnetic disk drive contains helium gas filling the interior 102 of the enclosure.

Patent Document 1 also discloses another airtight structure for the magnetic disk drive as shown in FIG. 7B (which is an enlarged sectional view). This airtight structure of dual cover type consists of an inner cover 240 and an outer cover 110. The inner cover 240 rests on the flange 221 of the base 120, with their gap completely filled with a non-airtight seal 242 inserted therein. The outer cover 110 is welded to the top of the side wall of the base 120.

The airtight structure mentioned above is not complete because the magnetic disk drive has to be mounted on an external unit by means of tapped holes made in its base according to its standard. So long as the base is formed by die-casing, such tapped holes tend to permit a low-density gas to leak out from the interior of the magnetic disk drive even though the base is hermetically closed by the cover.

Gas leakage through tapped holes is due to the nature of die casting. Molten aluminum alloy cast into a mold cools and solidifies inward, but not evenly throughout. However, it easily fills uniformly large parts in the mold cavity and then it cools and solidifies therein at a constant rate, thereby allowing the resulting die-cast product to have a uniform density.

However, the foregoing does not hold true for those parts of the mold in which tapped holes are made. Such parts have thicker and more complex shapes than their surrounding parts and hence prevent the melt from uniform flow, complete filling, and rapid cooling, but allow it (remaining hot longer than its surroundings) to expand during cooling. The resulting die-cast product has many shrinkage cavities in which the aluminum alloy has a decreased density. These shrinkage cavities lend themselves to passage of the low-density gas from the interior of the magnetic disk drive to the tapped holes.

The magnetic disk drive having an enclosure filled with a low-density gas is subject to gas leakage mostly through tapped holes made in the bottom of the enclosure. For prevention of gas leakage, it is necessary to reduce shrinkage cavities that occur near tapped holes.

BRIEF SUMMARY OF THE INVENTION

Embodiments in accordance with the present invention provide a magnetic disk drive with an enclosure that prevents low-density gas from leaking out owing to reduction of shrinkage cavities near tapped holes. According to the particular embodiment shown in FIG. 1, an aluminum alloy is forced into that region 42 of the base 12, in which the tapped hole 50 is to be made, by squeezing in the final stage of die casting to form the base 12. This procedure increases the density of aluminum alloy above 2.7 g/cm$^3$, and the densified aluminum alloy in the region for tapped holes is free of shrinkage cavities that can cause gas leakage.

DETAILED DESCRIPTION OF THE INVENTION

Embodiments in accordance with the present invention relate to a magnetic disk drive and, more particularly, a sealed magnetic disk drive capable of hermetically retaining therein a low-density gas such as helium.

An object of embodiments of the present invention is to provide a magnetic disk drive with an enclosure that prevents the low-density gas from leaking out owing to reduction of shrinkage cavities near tapped holes.

The above-mentioned object may be achieved by a magnetic disk drive of the type having a base on which are mounted a disk, a spindle motor to drive said disk, a head to record and reproduce information on said disk, and an actuator assembly to move said head on said disk in its radial direction, and a top cover connected to said base, with said base and said top cover forming an interior space which is hermetically filled with a gas lighter than air, wherein said base is made of die-cast metal and has tapped holes formed inward from the bottom surface thereof, with their surrounding metal having a higher density than the metal constituting the whole base.

In certain embodiments, the tapped holes are surrounded by the same material as the base which is filled by squeezing. In certain embodiments, the tapped holes are close to the shroud that houses the magnetic disk. The tapped holes are intended to fix the magnetic disk drive to an external unit.

The base is made of die-cast aluminum alloy and is surrounded by an aluminum alloy which is filled by squeezing.

The magnetic disk drive according to embodiments of the present invention is characterized in that the whole base is made of an aluminum alloy having a density of 2.6 to 2.7 g/cm$^3$ and the tapped holes, which are formed inward from the bottom surface of the base, are surrounded by an aluminum alloy having a density no lower than 2.7 g/cm$^3$.

The magnetic disk drive according to embodiments of the present invention retains the low-density gas filled therein without leakage through tapped holes formed in the base thereof.

Figure 2:
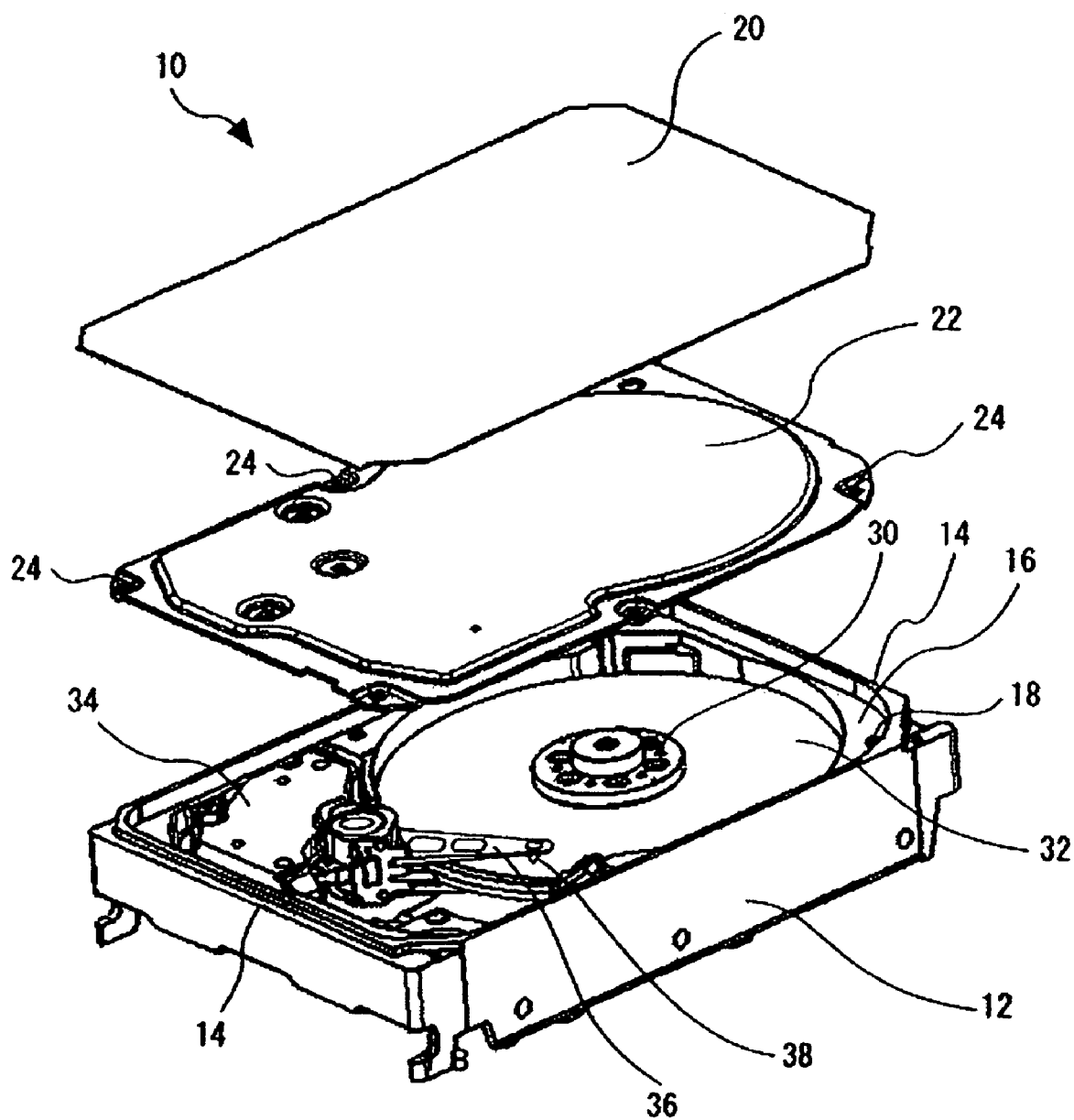
FIG. 2 is an explode perspective view showing the entire structure of the magnetic disk drive pertaining to an embodiment of the present invention.

A detailed description is given below of the best mode of carrying out the present invention as illustrated in the accompanying drawings. FIG. 2 is an exploded perspective view showing the magnetic disk drive according to embodiments of the present invention. The magnetic disk drive 10 has a base 12, a side wall 14 extending from the base 12, an inner cover 22, and an outer cover 20. These components constitute the enclosure, with the inner cover 22 screwed onto the flange 16 of the side wall 14 and the outer cover welded to the top of the side wall 14. The enclosure houses the following components for data recording and reproduction. A spindle motor 30 which is fixed to the bottom of the base 12. A magnetic disk 32 (as a data recording medium) which is fixed to the spindle motor 30 for its rotation. An actuator assembly 34 (including a voice coil motor) which is mounted on the base 12. A head-gimbal assembly which is fixed to the actuator assembly 34 for its driving. A magnetic head 38 which is attached to the forward end of the head-gimbal assembly 36. The magnetic head 38 is positioned on the magnetic disk 32 as the head-gimbal assembly 36 turns in the radial direction of the magnetic disk 32, so that it records and reproduces data to and from the magnetic disk 32. It is integral with the slider having the air bearing surface (ABS).

The magnetic disk drive also has an FPC assembly (not shown) through which the magnetic head 38 and the motors are connected to their controlling circuit board outside the enclosure. The FPC assembly also transfers data to and from the magnetic head for recording and reproduction and supplies electric power to the motors. Incidentally, the term HDA (head disk assembly) will be used hereunder to collectively denote the spindle motor 30, the magnetic disk 32, the actuator assembly 34, and the head-gimbal assembly 36, which are housed in the enclosure.

The enclosure is hermetically filled with a low-density gas by closing it with the inner cover 22 in the atmosphere of a low-density gas or by injecting a low-density gas into the enclosure which has previously been provided with the inner cover 22. The low-density gas includes helium and hydrogen, with the former being preferable because of its high stability.

The enclosure is completely sealed by laser-welding the outer cover 20 to the top of the side wall extending from the base 12. The base 12 and the outer cover 20 should be formed from adequate materials selected from the view point of durability and reliability. For laser welding, die-cast aluminum is suitable for the base and pressed or machined aluminum is suitable for the outer cover.

The magnetic disk drive according to embodiments of the present invention undergoes assembling and inspection steps during its manufacturing process. The assembling step yields a temporarily assembled unit capable of operation, which is subsequently checked for performance in the inspection step. Defective units, if found, are returned to the assembling step for rework (replacement of rejected parts). To facilitate rework, the inner cover 22 is temporarily screwed to the flange 16 of the side wall 14 extending from the base 12 by means of through-holes 24 (made in the periphery of the inner cover 22) and tapped holes 18 (made in the base 12). After the inspection step, the outer cover 20 is permanently fixed for hermetic sealing.

The inner cover 22 is formed from a plate of stainless steel, aluminum, or brass. It has a belt-like seal of elastomer (such as fluororubber) on its entire periphery that comes into contact with the flange 16. This seal temporarily retains helium gas in the enclosure and keeps the interior space (holding HDA), which is surrounded by the base 12 and the inner cover 22, away from gas and dust that occur when the outer cover 20 is fixed.

Figure 3:
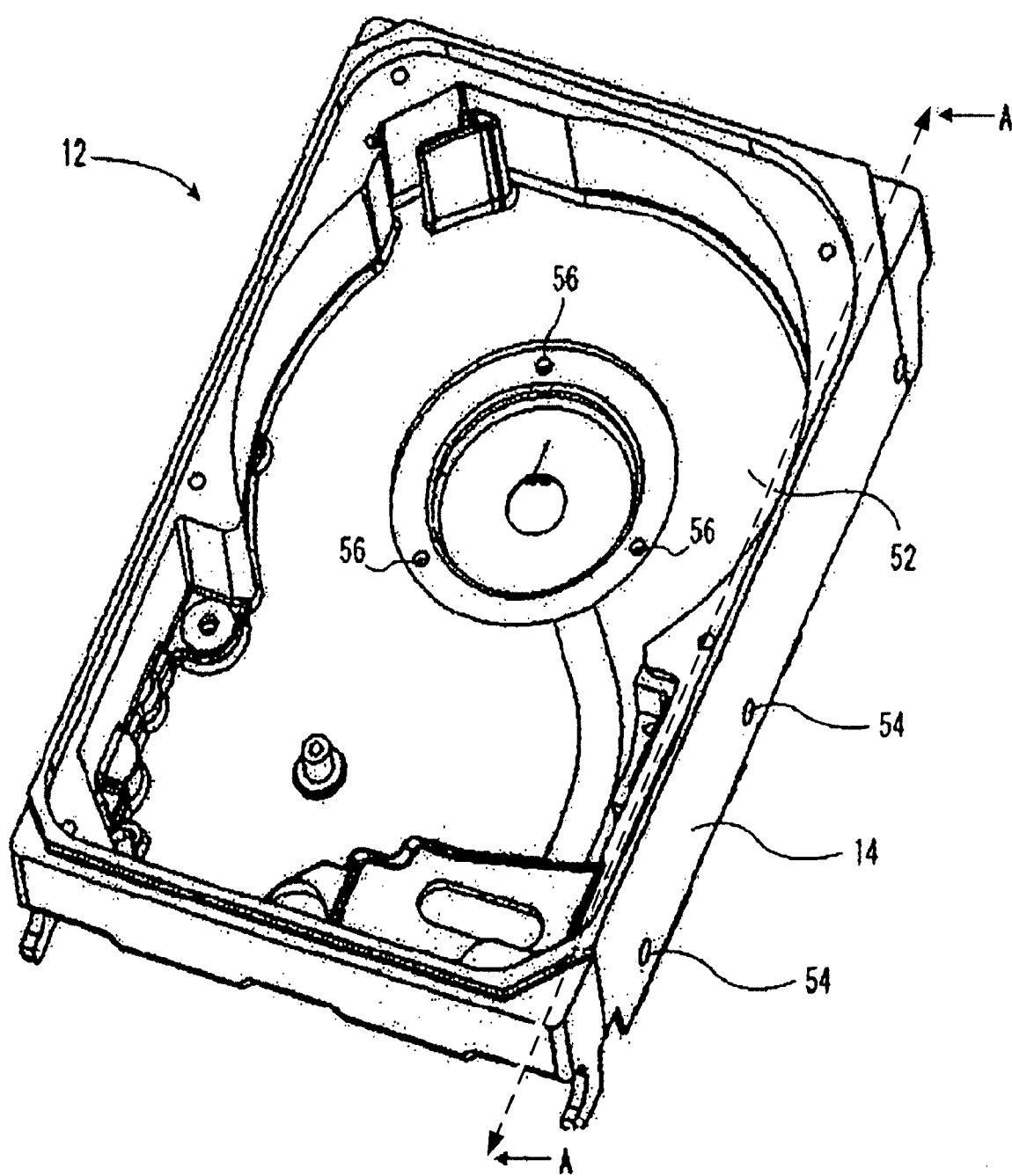
FIG. 3 is a top view showing the base (with HDA not yet mounted therein) of the magnetic disk drive pertaining to an embodiment of the present invention.

The base, with HDA not yet mounted, as viewed from above is shown in FIG. 3. Inside the base is the shroud's inner space 52 to hold the magnetic disk 32.

Figure 4:
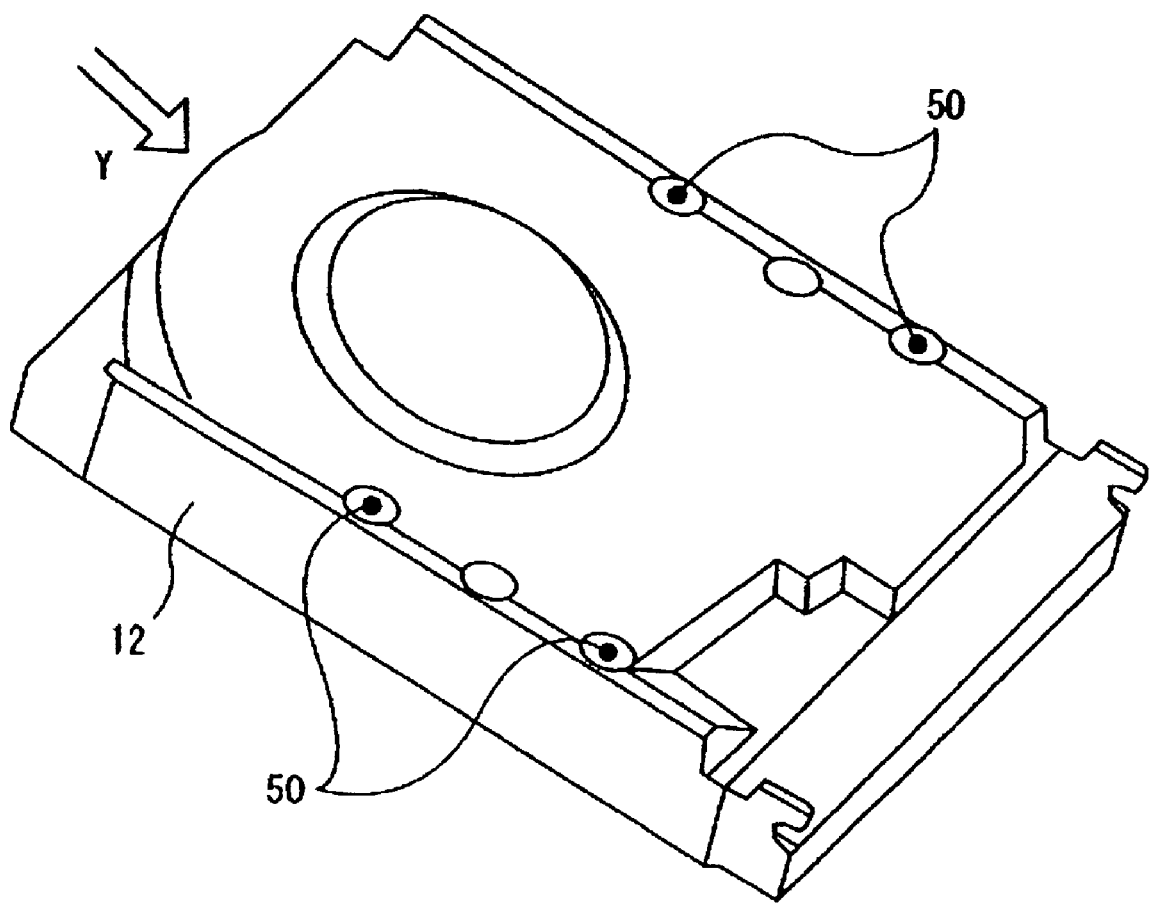
FIG. 4 is a rear view showing the base shown in FIG. 3.

The base as viewed from rear is shown in FIG. 4. It has tapped holes 50 for the magnetic disk drive to be fixed to an external unit according to the standard.

Figure 5:
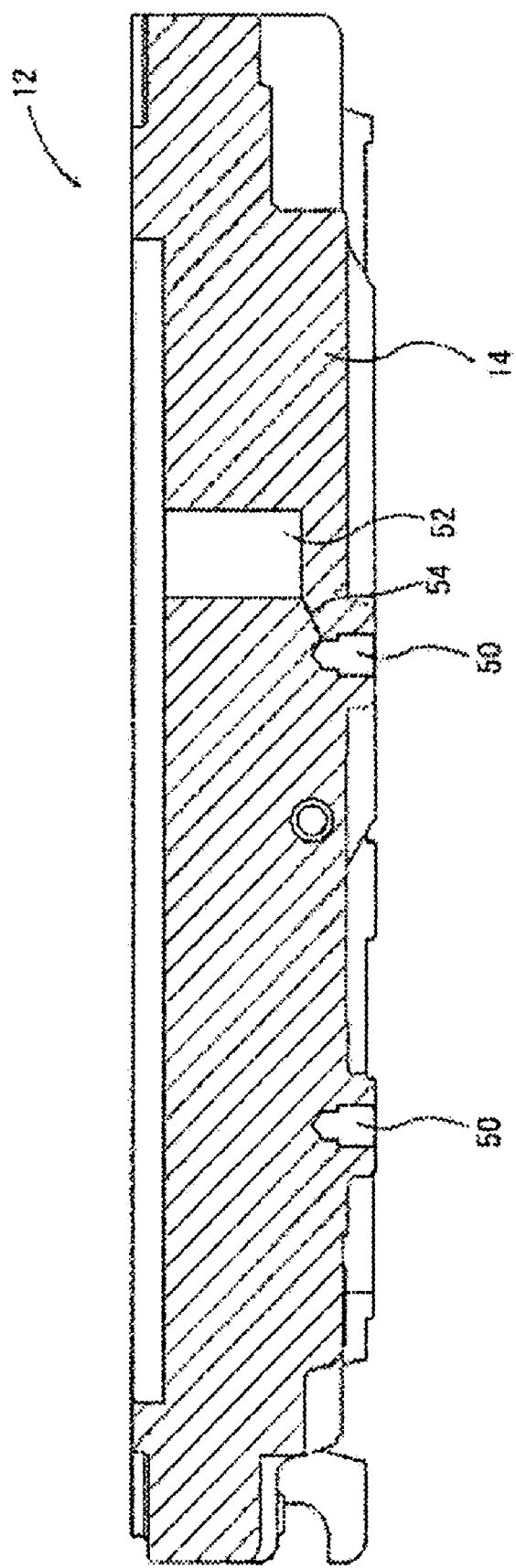
FIG. 5 is a sectional view showing that part of the base through which gas leakage tends to occur.

FIG. 5 is a sectional view taken along the line A-A in FIG. 3. It is to be noted that the tapped hole 50 (shown in FIG. 4) in the reverse of the base is close to the shroud's inner space 52 in the front of the base, as indicated by the arrow 54. That part of the side wall 14 in which the tapped hole 50 is made is thicker than its surrounding part and hence has a lower density (which leads to many shrinkage cavities). Such shrinkage cavities in the side wall 14 form passages for the low-density gas (sealed in the enclosure) to leak from the shroud's inner space 52 to the tapped hole 50. Another tapped hole 50 is also close to the space in which the head gimbal assembly is to be mounted, and this causes the problem of gas leakage from the enclosure.

Figure 1:
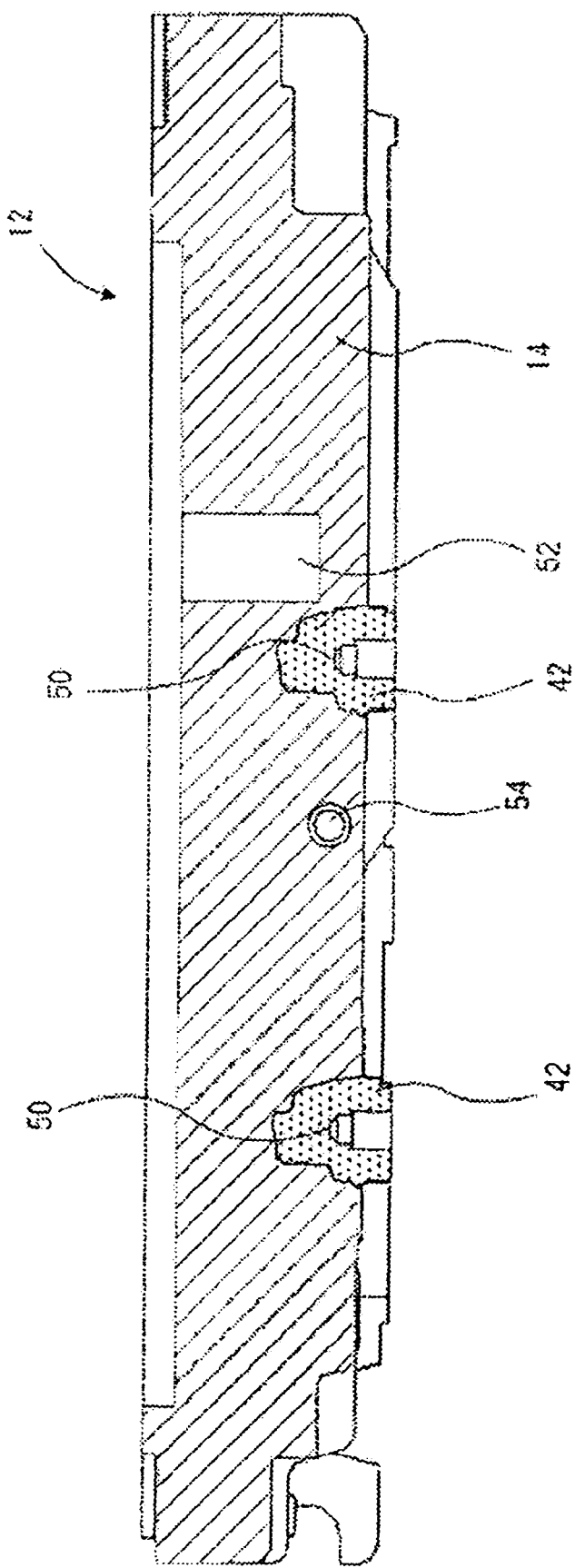
FIG. 1 is a sectional view (taken along the line A-A in FIG. 3) showing the side wall of the base of the magnetic disk drive pertaining to an embodiment of the present invention.

Embodiments of the present invention address the problem of gas leakage and are designed to increase the density of aluminum alloy in the vicinity of the tapped hole. This object is achieved by forcing aluminum alloy (by squeezing) into that region 42 of the base 12, in which the tapped hole 50 is to be made, in the final stage of die casting for the base of aluminum alloy. The base 12 with densified regions for tapped holes is shown in section in FIG. 1 which corresponds to FIG. 5. The density of aluminum alloy increases to about 2.7 g/cm$^3$ in the region 42, in which the tapped hole 50 is to be made, as the result of squeezing. The increased density reduces shrinkage cavities in the region 42, thereby preventing gas leakages through the region 42 in which the tapped hole 50 is made.

Figure 6:
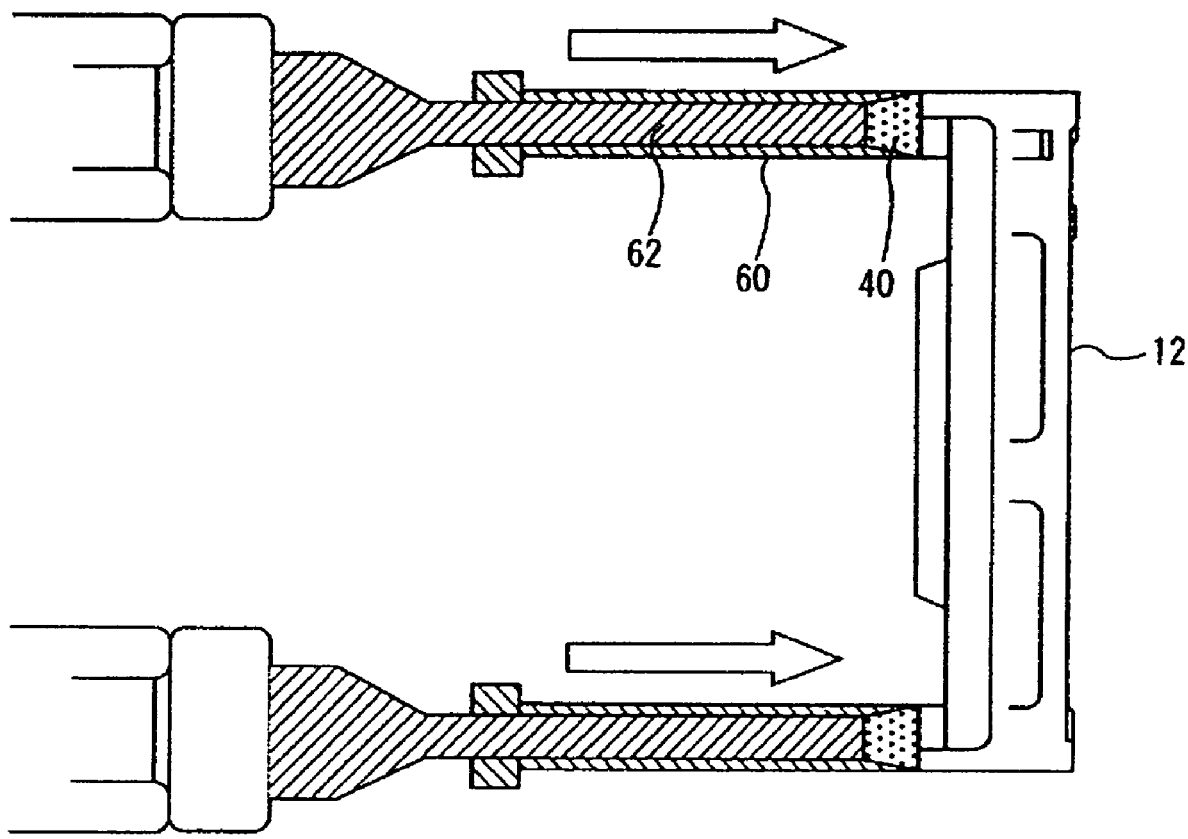
FIG. 6 is a diagram illustrating how to fill aluminum alloy by squeezing.
Figure 7:
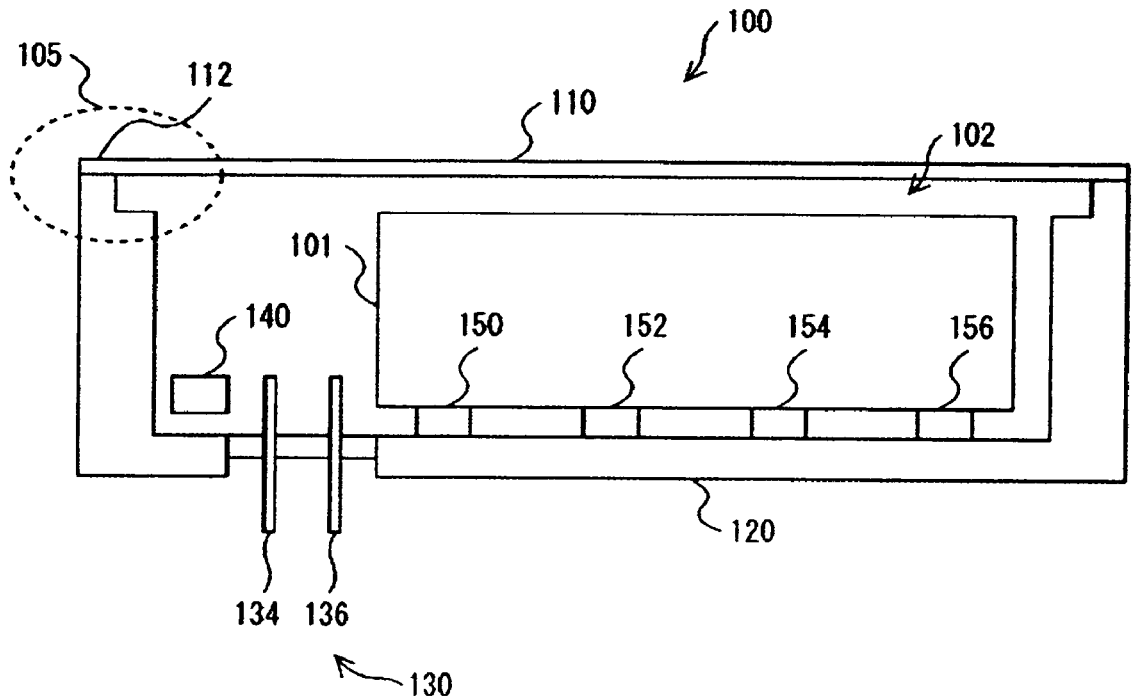
FIG. 7A is a sectional view showing the sealing structure of the enclosure of the conventional magnetic disk drive.
FIG. 7B is a sectional view showing the sealing structure of the enclosure of the conventional magnetic disk drive.
Figure 7:
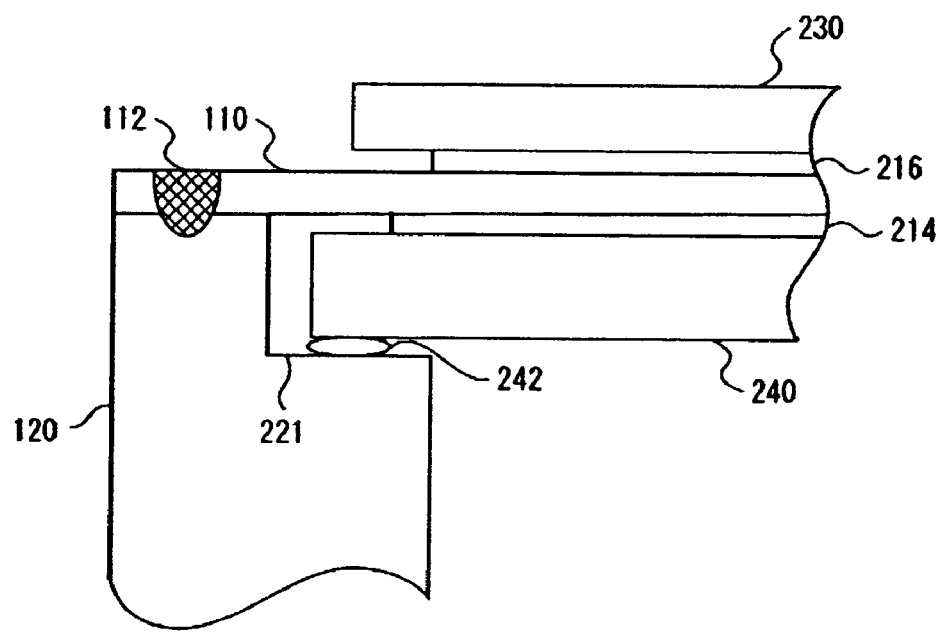

Squeezing (or local pressing) of aluminum alloy is accomplished in the following way as shown in FIG. 6 (viewed in the direction of the arrow Y in FIG. 4). There is shown the base 12 in the final stage of die casting, with the mold omitted. Immediately before the die-cast aluminum alloy of the base 12 solidifies, the forward end of the bushing 60 is brought into contact with the top of the region 42 for the tapped hole in the base 12 and the plunger 62 is driven in the direction of the arrow, so that the molten aluminum alloy 40 held between the bushing 60 and the plunger 62 is forced into the region 42 of the base 12. The thus squeezed molten aluminum alloy 40 collapses the shrinkage cavities in the region 42. The plunger 62 is driven at a pressure of 150 kgf/cm$^3$, which is equivalent to a pressure of 9000 kgf/cm$^2$ for each tapped hole. Filling with aluminum alloy under pressure in this manner causes the aluminum alloy in the region 42 for the tapped hole 50 to increase in density above 2.7 g/cm$^3$.

The above-mentioned procedure for filling with aluminum alloy under pressure may be applied to not only the taped holes 50 but also other parts 54 and 56 (shown in FIG. 3) in which tapped holes or holes are made from the outside or inside of the base 12. It completely prevents gas leakage due to shrinkage cavities.

Squeezing mentioned above may be replaced by inserting before die casting a premolded piece of metal of specific density (with a tapped hole made therein) in that part of the base where the tapped hole is required.

The base obtained in the above-mentioned embodiment is characterized in that the aluminum alloy as a whole has a density of 2.6 to 2.7 g/cm$^3$ and the aluminum alloy in the squeezed region has a density no lower than 2.7 g/cm$^3$, and it showed no sign of gas leakage from the enclosure.

The magnetic disk drive (free of gas leakage) containing helium gas completely sealed therein achieves improved performance owing to rapid and accurate positioning control, power saving, low noise level, and high-speed disk rotation and rapid head-gimbal assembly driving (without power saving). In addition, the completely sealed enclosure makes HDA immune to variation in temperature and atmospheric pressure and also protects the motor oil in HDA from deterioration by oxidation.

What is claimed is:

1. A magnetic disk drive of the type having a base on which are mounted a disk, a spindle motor to drive said disk, a head to record and reproduce information on said disk, and an actuator assembly to move said head on said disk in its radial direction, and a top cover connected to said base, with said base and said top cover forming an interior space which is hermetically filled with a gas lighter than air, wherein said base is made of die-cast metal and has tapped holes formed inward from the bottom surface thereof, with their surrounding metal having a higher density than the metal constituting the whole base.

2. The magnetic disk drive as defined in claim 1, wherein the tapped holes are surrounded by the same material as the base which is filled by squeezing.

3. The magnetic disk drive as defined in claim 1, wherein the tapped holes are close to the shroud that houses the magnetic disk.

4. The magnetic disk drive as defined in claim 1, wherein the tapped holes are intended to fix the magnetic disk drive to an external unit.

5. The magnetic disk drive as defined in claim 1, wherein the base is made of die-cast aluminum alloy and are surrounded by an aluminum alloy which is filled by squeezing.

6. A magnetic disk drive of the type having a base on which are mounted a disk, a spindle motor to drive said disk, a head to record and reproduce information on said disk, and an actuator assembly to move said head on said disk in its radial direction, and a top cover connected to said base, with said base and said top cover forming an interior space which is hermetically filled with a gas lighter than air, wherein the whole base is made of an aluminum alloy having a density of 2.6 to 2.7 g/cm3 and the tapped holes, which are formed inward from the bottom surface of the base, are surrounded by an aluminum alloy having a density no lower than 2.7 g/cm3.

7. The magnetic disk drive as defined in claim 6, wherein the tapped holes are surrounded by the same material as the base which is filled by squeezing.

8. The magnetic disk drive as defined in claim 6, wherein the tapped holes are close to the shroud that houses the magnetic disk.

9. The magnetic disk drive as defined in claim 6, wherein the tapped holes are intended to fix the magnetic disk drive to an external unit.

* * * * *